United States Patent
Beelitz et al.

(10) Patent No.: US 7,721,078 B2
(45) Date of Patent: May 18, 2010

(54) METHOD AND SYSTEM TO DYNAMICALLY BOOT TO A NON-VISIBLE PARTITION

(75) Inventors: Alan E. Beelitz, Leander, TX (US); Shree A. Dandekar, Round Rock, TX (US); Roy W. Stedman, Austin, TX (US); Reva L. Tolliver, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 852 days.

(21) Appl. No.: 11/590,159

(22) Filed: Oct. 31, 2006

(65) Prior Publication Data

US 2008/0104380 A1 May 1, 2008

(51) Int. Cl.
- G06F 9/24 (2006.01)
- G06F 9/00 (2006.01)
- G06F 1/24 (2006.01)
- G11B 15/10 (2006.01)

(52) U.S. Cl. .............................. 713/1; 713/2; 713/100; 360/137

(58) Field of Classification Search ...................... 713/1, 713/2, 100; 360/900
See application file for complete search history.

(56) References Cited

U.S. PATENT DOCUMENTS

| | | | |
|---|---|---|---|
| 5,944,820 A | 8/1999 | Beelitz | |
| 6,032,239 A | 2/2000 | Beelitz | |
| 6,041,395 A | 3/2000 | Beelitz | |
| 6,279,093 B1 | 8/2001 | Beelitz | |
| 6,298,427 B1 | 10/2001 | Beelitz | |
| 6,430,663 B1 * | 8/2002 | Ding | 711/162 |
| 6,470,434 B1 | 10/2002 | Beelitz | |
| 6,691,213 B1 * | 2/2004 | Luu et al. | 711/163 |
| 6,862,681 B2 * | 3/2005 | Cheston et al. | 713/2 |
| 7,024,549 B1 * | 4/2006 | Luu et al. | 713/2 |
| 2002/0162444 A1 * | 11/2002 | Yu et al. | 84/601 |
| 2003/0182546 A1 * | 9/2003 | Suzuki et al. | 713/1 |
| 2004/0083405 A1 * | 4/2004 | Chang et al. | 714/24 |
| 2005/0027978 A1 * | 2/2005 | Neuman et al. | 713/2 |
| 2005/0246486 A1 * | 11/2005 | Chiu et al. | 711/112 |
| 2005/0283828 A1 * | 12/2005 | Perley et al. | 726/4 |
| 2007/0174545 A1 * | 7/2007 | Okada et al. | 711/112 |
| 2007/0219919 A1 * | 9/2007 | Dandekar et al. | 705/59 |

* cited by examiner

*Primary Examiner*—Ji H Bae
(74) *Attorney, Agent, or Firm*—Larson Newman & Abel, LLP

(57) ABSTRACT

A system and method for accessing a hidden partition during a boot sequence is disclosed. An information handling system can include a basic input output system (BIOS) that can be operable to access a master boot record (MBR) of a storage device. The digital media storage device can include a fixed number of visible partitions and at least one hidden partition. The information handling system can further include a processor operable to detect a boot event operably associated with initiating a request to access contents that can be stored within an associated hidden partition of the storage device. The information handing system can also include a memory that can be operable to store at least a portion of the contents of the hidden partition. The contents can be stored upon accessing the hidden partition using an association established between one of the fixed number of visible partitions and the hidden partition.

11 Claims, 3 Drawing Sheets

METHOD AND SYSTEM TO DYNAMICALLY BOOT TO A NON-VISIBLE PARTITION

FIELD OF THE DISCLOSURE

This disclosure relates generally to information handling systems, and more particularly to a system and method for dynamically booting to non-visible partitions within information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Initialization of conventional information handling systems can begin with accessing a system's basic input output system (BIOS) using the microprocessor of the information handling system. When the BIOS boots up the system, the BIOS typically first determines the functionality of critical hardware components and then loads all or a portion of the operating system from a system hard disk drive, diskette drive, or optical drive. The BIOS enables an operating system and various other applications to not have to understand exact details (such as hardware addresses) about various electronic components within an information handling system. For example, an operating system can not have to keep track of addressing for devices such as hard disk drives, video adapters, keyboards, pointing devices, printers, and other devices. As such, altering or changing an input/output device typically does not require an application or operating system to be modified in order to operate as an information handling system's BIOS typically handles this function.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
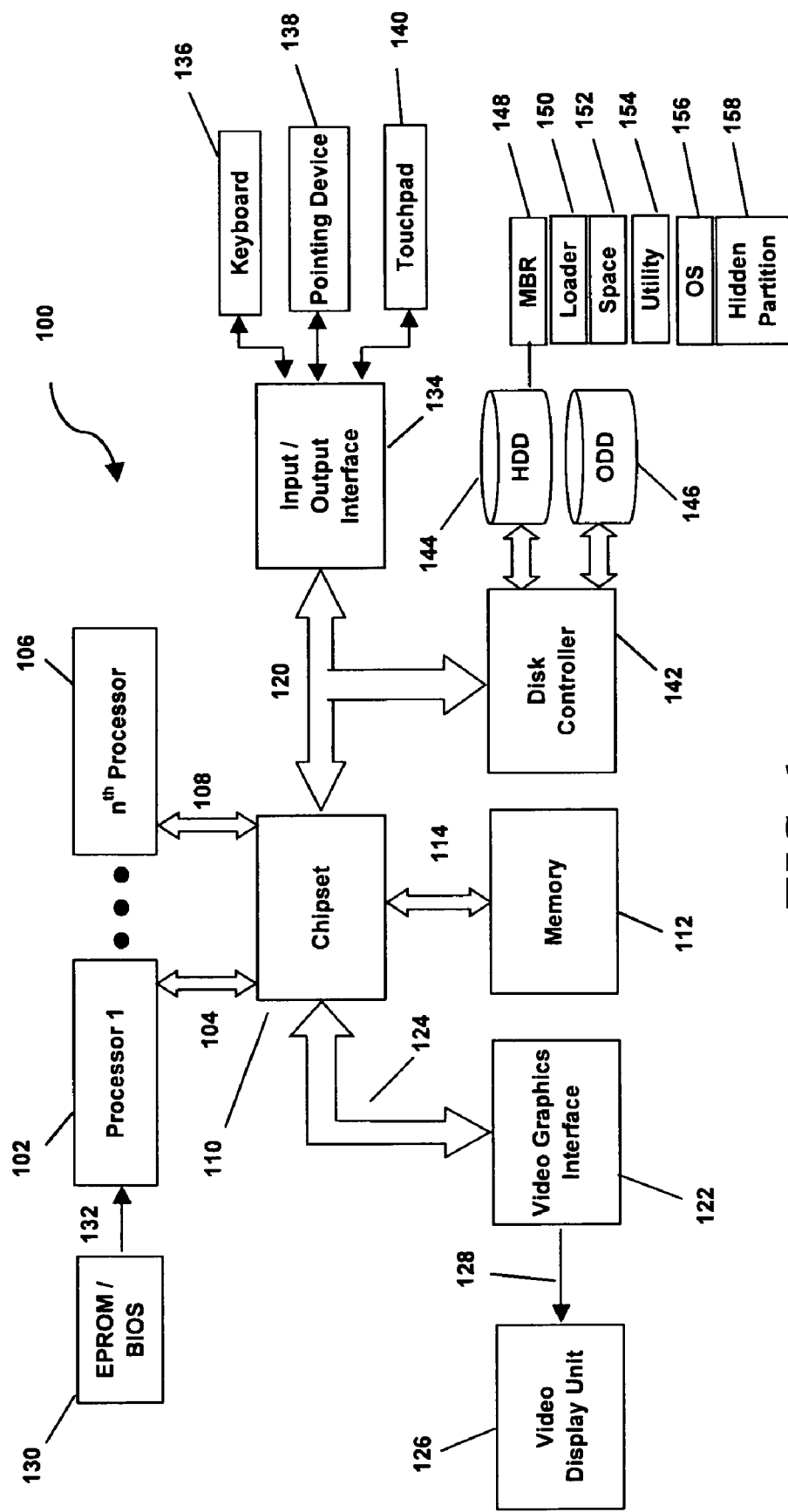
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, an information handling system can include a basic input output system (BIOS) that can access a master boot record (MBR) of a storage device. The digital media storage device can include a visible partition and at least one hidden partition. The information handling system can further include a processor operable to detect a boot event operably associated with initiating a request to access contents stored within an associated hidden partition of the storage device. The information handling system can also include a memory operable to store at least a portion of the contents of the hidden partition. The contents can be stored upon accessing the hidden partition using an association established between the visible partition and the hidden partition.

According to another aspect, a method of booting an information handling system is disclosed. The method can include detecting an input selection provided in association with accessing an operating system stored within a hidden partition of a storage device and setting a boot flag in response to detecting the input selection. The method can further include exposing the hidden partition upon detecting an inactive visible partition of the storage device. The method can further include making at least a portion of the contents of the hidden partition available to a memory during a boot sequence.

According to a further aspect, a method for booting an information handling system using a hidden partition of a storage device is disclosed. The method can include receiving a boot request and accessing a master boot record (MBR) of a hard disk drive (HDD) to determine a current operating state of the HDD. The method can further include activating an application loader associated with the HDD to modify an initialization sequence in response to a media boot flag being set. The method can also include determining an operating status of a visible partition. The method can further include exposing a hidden partition within the HDD in response the operating status being inactive. The method can also include enabling access to the hidden partition using a first descriptor of the visible partition.

FIG. 1 illustrates a block diagram of an exemplary embodiment of an information handling system, generally designated at 100. In one form, the information handling system 100 can be a computer system such as a desktop computer, a laptop computer, or other portable computer systems. As shown in FIG. 1, the information handling system 100 can include a first physical processor 102 coupled to a first host bus 104 and additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can be operable to support multiple processors and processor operations. The chipset 110 can allow for simultaneous processing of multiple processors and support the exchange of information within information handling system 100 during such operations.

According to one aspect, the chipset 110 can be referred to as a memory hub or a memory controller. For example, the chipset 110 can include an Accelerated Hub Architecture (AHA) that uses a dedicated bus (not expressly shown) to transfer data between first physical processor 102 and the $n^{th}$ physical processor 106. For example, the chipset 110 including an AHA enabled-chipset and can include a memory controller hub and an input/output (I/O) controller hub. As a memory controller hub, the chipset 110 can function to provide access to the first physical processor 102 using the first bus 104 and nth physical processor 106 using the second host bus 108. The chipset 110 can also provide a memory interface for accessing a memory 112 using a third host bus 114. In a particular embodiment, the host buses 104, 108, and 114 can be individual buses or part of the same bus. The chipset 110 can also provide bus control and handles transfers between the host buses 104, 108, 114.

According to one aspect, the chipset 110 can be provided as application specific chipset that provides connectivity to various buses, and integrates other system functions such as a memory interface. For example, the chipset 110 can be provided using an Intel® Hub Architecture (IHA) chipset also that can include two parts, a Graphics and AGP Memory Controller Hub (GMCH) and an I/O Controller Hub (ICH). For example, an Intel 820E, 815E chipset, or combinations thereof, available from the Intel Corporation of Santa Clara, Calif., can provide at least a portion of the chipset 110. The chipset 110 can also be packaged as an application specific integrated circuit (ASIC).

Information handling system 100 can include a video graphics interface 122 that can be coupled to the chipset 110 using a fourth host bus 124. In one form, a video graphics interface 122 can be provided as an Accelerated Graphics Port (AGP) interface to display content within a video display unit 124. The video display unit 124 can include one or more types of video displays and in one form can include a flat panel display (FPD) such as a liquid crystal display or other form of flat panel display technology.

The information handling system 100 can further include a basic input output system (BIOS) stored within an electrically programmable read-only memory (EPROM) device 130 that can be accessed by first physical processor 102 during initialization, reset, rebooting, or powering up of information handling system 100. In one embodiment, the $n^{th}$ processor 106 can access the BIOS when needed. The BIOS can be provided using a BIOS input 132 to the first physical processor 102 during initialization, rebooting, or start-up of the information handling system 100.

The information handling system 100 can also include an input/output interface 138 that can be connected via the fourth host bus 120 to the chipset 110. The input/output interface 134 can use industry standard buses or proprietary buses or respective interfaces, controllers, or any combination thereof. The information handling system 100 can further include an input/output interface 134 connected via the fourth bus 120 to the chipset 110. The input/output interface 134 can be coupled to several types of input and output devices including a keyboard 136, a pointing device 138, and a touch pad 140.

The fourth host bus 120 can also include a Peripheral Component Interconnect (PCI) bus or a high speed PCI-Express bus. PCI and PCI-Express buses include industry standard buses that can provide interconnect to, and establish communication between, various PCI-enabled hardware devices. Other buses can also be provided in association with, or independent of, the fourth host bus 120 including other industry standard buses or proprietary buses, e.g., ISA, SCSI, I2C, SPI, USB buses. The information handling system 100 can further includes a disk controller 142 coupled to the fourth bus 120. The disk controller 142 can be used to connect one or more digital media storage devices such as a hard disk drive (HDD) 144 and an optical disk drive (ODD) 146 such as a R/W-CD, R/W-DVD, R/W mini-DVD, or other type of optical disk drive.

According to one aspect, the HDD 144 can include a MBR 148, an application loader 150, a disk space 152, and one or more visible partitions that can include a utility partition 154 and a primary OS partition 156, and at least one hidden partition 158. In one form, the HDD 144 can be used as a primary hard disk drive for initializing the information handling system 100 and can include up to four visible partitions that can be accessed by the information handling system 100 during initialization of the information handling system 100.

In an alternate embodiment, the chipset 110 can be provided as a chipset employing a Northbridge/Southbridge configuration (not expressly shown). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not expressly shown) of the chipset 110 and can handle input/output (I/O) functions of the chipset 110. The Southbridge portion can manage the basic forms of input/output (I/O) such as Universal Serial Bus (USB), serial I/O, audio outputs, Integrated Drive Electronics (IDE), and Industry Standard Architecture (ISA) I/O for the information handling system 100.

During operation of the information handling system 100, the BIOS within EPROM 130 can be accessed by the first physical processor 102 during a boot, reboot, power up, initialization, or reset of the information handling system 100. For example, an initialization sequence or boot sequence can be provided during a system reboot or power-up of the information handling system 100. The BIOS can be used to manage data flow between the information handling system's 100 attached devices such as HDD 144, ODD 146, keyboard 136, pointing device 138, touch pad 140, video graphics interface 122, and various other devices or components that can be coupled to the information handling system 100. During reboot or initialization of the information handling system 100, the BIOS can initiate access to the MBR 148 stored within the HDD 144 to determine an operating system to load into the system memory 112. For example, the MBR 148 can be typically stored within a first sector of the HDD 144 and can include a partition table, such as partition table 200 depicted in FIG. 2. In one form, a partition table can be used to determine how many partitions the HDD 144 may be divided into and a boot sequence for loading one or more partitions. For example, the HDD 144 can be divided into four (4) partitions and used by the MBR 144 during a boot sequence. The MBR 144 can be used to determine a location and description of a specific partition to boot. For example, MBR 144 can provide a description of the partition and the address location with the HDD 144 of the first sector of the partition. In one form, booting a partition can include loading the contents of the partition into system memory 112 and executing the contents using the first physical processor 102, or the $n^{th}$ physical processor 106, or any combination thereof, to provide an operating environment for the information handling system 100.

According to one aspect, the information handling system 100 can access the hidden partition 158 during a boot sequence to load an operating system that may not be provided within one of the visible partitions. For example, the information handling system 100 can be responsive to an input to the keyboard 136 operable to initiate access to an operating system stored within the hidden partition 158. Upon the information handling system detecting the keyboard input, the MBR 144 of the HDD 144 can be used to obtain access to the hidden partition 158 and can load the contents of the hidden partition 158 into the system memory 112. The contents may be loaded, in whole or in part, into the system memory 112 of the information handling system 100. In this manner, the hidden partition 158 can be accessed by an input from the keyboard 136 and a separate operating system provided within the hidden partition 158 can be accessed by the information handling system 100.

According to a further aspect, the information handling system 100 can access the hidden partition 158 during initialization of the information handling system 100. The information handling system 100 can access the MBR 148 and the application loader 150 associated with the MBR 148. For example, the application loader 150 can be used to expose or access the hidden partition 158 by exchanging a descriptor of a visible partition, such as the utility partition 152, with the descriptor of the hidden partition 158. In this manner, a descriptor for a visible partition, such as the utility partition 152, can be associated with the hidden partition 158, and at least a portion of the contents of the hidden partition 158 can be available during a boot sequence or initialization.

Figure 2:
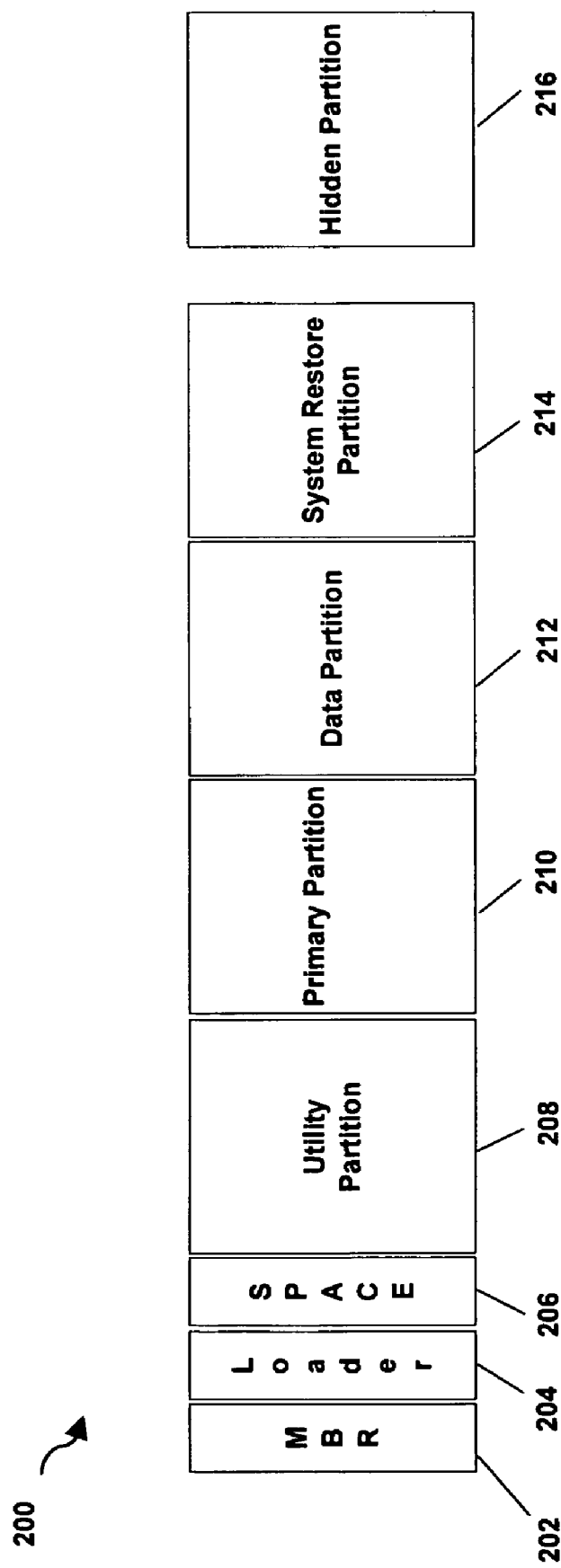
FIG. 2 illustrates a block diagram of a master boot record and partitions within a storage device for use within an information handling system according to another aspect of the disclosure.

FIG. 2 illustrates a block diagram of a master boot record and partitions within a digital storage medium storage device, depicted generally at 200. The storage device 200 can be used in association with an information handling system, such as the information handling system 100 illustrated in FIG. 1. The storage device 200 can include a hard disk drive (HDD), optical disk drive (ODD), a magnetic tape drive (MTD), a holographic memory, or other types of memory or storage devices that can be operable to store information.

According to one aspect, the storage device 200 can include a master boot record (MBR) 202, an application loader 204, a disk space 206, and various visible partitions that can include information such as an operating system, formatting information, system restore information, an operating system, user files, applications, other types of information that can be provided within a visible partition, or any combination thereof. For example, visible partitions can include logical divisions of the storage device 200 that may be accessed by an information handling system to load different operating systems using the same storage device 200. Visible partitions can allow the storage device 200 to create an appearance of having separate digital storage medium storage devices for file management, multiple user access, additional operating systems, or other applications.

In one form, the MBR 202 can also include information provided in a first sector of a hard disk drive or other storage device that can be used to identify the location (addresses) of one or more operating systems that can be booted or loaded into a memory of an information handling system. According to one aspect, the MBR 202 can be referred to as a "partition sector" or the "master partition table" and can include a table or listing of information that can be used to locate each visible partition the storage device 200 may have been formatted or divided into. The MBR 202 can also access the program loader 204 operable to read a boot a sector record of a specific partition that can include an operating system that may be booted by the information handling system.

In one form, the storage device 200 can include up to four (4) visible partitions or divisions including a utility partition 208, a primary partition 210 that can store a primary operating system (OS), a data partition 212 that can store data files and other information, and a system restore partition 214 that can include an image of an operating system for restoring an operating system to an initial or factory installed state. In one form, the primary partition 210 can be a visible partition operable to store a primary operating system that can be loaded into a memory and executed by the information handling system to provide a default operating environment for the information handling system. For example, the primary operating system stored within the primary partition 210 can include software such as a Windows® based operating system, a Linux® based operating system, a Sun® based operating system, or any other type of operating system that can be provided within the primary partition 210.

According to one aspect, the data partition 212 can be provided to store data that can be accessed by the operating system. For example, user-specific information, content (e.g. music, video, pictures, etc.), application data, data files, and other data can be stored and accessed by the information handling system. The system restore partition 214 partition can include an image file of the operating system and other files provided in association with an information handling system during installation of the initial software of the information handling system. The system restore partition 214 can be accessed by the information handling system to restore the information handling system to an initial operating state in the event of failure, when an operating system or other file or files become corrupt, during diagnostic testing of an information handling system, etc. Various other situations can also warrant accessing the system restore partition 214 to restore an information handling system to an factory installed state.

In one form, the hidden partition 216 provided within the storage device 200 can include a secured or protected partition that can be provided using an invisible descriptor. An invisible descriptor can include a descriptor that may not be accessed by a user or other applications of the information handling system 200. In one form, an invisible descriptor includes a descriptor that may not be normally presented within the MBR 202 of the storage device 200 and can be used to reference a partition that can be made visible dynamically on an as-desired basis and can remain hidden until desired. The hidden partition 216 can be used to store data such as an application or operating system accessed by the information handling system in response to an event detected by the information handling system. In one embodiment, the hidden partition 216 can include media applications such as Media Direct by Dell Inc., Instant-On or QuickPlay by Hewlett Packard Inc., or various other media applications. For example, MediaDirect can be employed to allow a system to boot up into a dedicated media player by powering up an information handling system, such as the information handling system 100 of FIG. 1, using a special MediaDirect button (not illustrated). In this manner, the dedicated media player can be accessible to the user quicker than in some embodiments where booting into an operating system may be required. Additionally, booting directly to the MediaDirect application using the hidden partition 216 can extend capabilities and safeguards for the information handling system 100 and may be provided in a non-specialized operating environment.

In other forms, an input can be provided in a variety of ways such as a user selecting a specific button or series of buttons of the information handling system, selecting an icon within a graphical user interface of the information handling system, selecting a physical button on a external device attached to the information handling system, etc. In one form, a user can interact with an information handling system and one or more events can be detected by the information handling system to initiate access at least a portion of the contents of the hidden partition 216. For example, a user may not need to select a physical button of the information handling system but can select access to a feature or module of another application provided within an operating system or the information handling system. The operating system may provide a request to access the hidden partition 216. As such, the hidden partition 216 can be accessed by user activated events or events provided by the information handling system or components, devices, software applications, or any combination thereof.

In one embodiment, an event can be detected by the information handling system prompting the information handling system to boot an operating system or application stored within the hidden partition 216. The information handling system can initiate a boot sequence and can determine an operating status of one of the visible partitions. For example, the storage device 200 can receive a request to access the hidden partition 216 and can determine if the utility partition 208 may be active. If the utility partition 208 may not be active, the application loader 202 may determine an address for the system restore partition 214 and the application loader 202 associates the hidden partition 216 to the system restore partition 208. For example, the program loader 202 can exchange the descriptor or address of the hidden partition 208 with the descriptor or address of the system restore partition 208. The hidden partition 216 can then be visible and accessed by the information handling system as if the hidden partition 216 were the system restore partition 208. As such, at least a portion or all of the contents of the hidden partition 216 can then be loaded into the memory of the information handling system and the information handling system can be booted or initialized using the hidden partition 216. In this manner, through providing at least one hidden partition within the digital storage medium device 200, greater flexibility for using applications, or operating systems, of other data or information, provided within hidden partitions may be realized without disrupting standard configurations or architectures for storage devices.

In one embodiment, the storage device 200 can be modified to include the application loader 204 within a visible or primary boot partition of the utility partition 208, the primary partition 210, the data partition 212 or the system restore partition 214, or any combination thereof. For example, the application loader's 204 code can be provided in a visible partition of an "always-boot" partition. An "always-boot" partition can include a visible partition that can be accessed before any other partition during a boot sequence and in some embodiments, may only be used to boot an information handling system. In one form, the application loader's 204 code provided within the "always-boot" partition can be provided as a separate reserved bootable partition. During a boot sequence, the storage device 200 can use the application loader 204 provided within the "always-boot" partition to patch or alter the MBR 202 of the storage device 200 to make the hidden partition 216 appear and accessible for booting the information handling system. Upon the information handling system booting using the hidden partition 216, the application loader 204 can then re-load the MBR 202 of the storage device 200. For example, the application loader 204 can be provided within an "always-boot" partition to reset the MBR 202 back to the reserved "always boot" partition including the loader application 204. In one form, the MBR 202 may not be altered and the application loader 204 can load the hidden partition 216 directly using code or software similar to the MBR's 202 software or code.

In another form, the application loader 204 can be stored within a "slack space" portion of the MBR 202. For example, the application loader 204 can be stored within "Track 0 (zero)" of the MBR 202 and can be accessed during an initialization sequence to access the hidden partition 216 as desired. In this manner, the application loader 204 need not be loaded into a partition of the storage device 200 and can be accessed during an initialization sequence.

In one form, the hidden partition 216 can be accessed by de-stroking and re-stroking the storage device 200. For example, a BIOS of an information handling system can load the MBR 202 into memory. The MBR 202 can load the application loader 204 into a different location in memory. The MBR 202 can transfer control to the application loader 204 and, the application loader can perform processing for handling initialization of the information handling system. For example, the application loader 204 can determine of the utility partition 208 is active. The application loader 204 can also exchange a descriptor of the HDD, such as the system restore partition 214, as desired to access the hidden partition 216. In one embodiment, the application loader 204 can de-stroke and re-stroke the storage device 200 to access the hidden partition 216. For example, the storage device 200 can be provided as a hard disk drive having a capacity of approximately one hundred (100) Gigabytes. During use, the hidden partition 216 may not be accessed (e.g. the hidden partition is hidden), and the storage device 200 can include a visible disk size of ninety (90) Gigabytes. When the hidden partition 216 is to be accessed, the application loader 204 can re-stroke the storage device 200 to access the hidden partition 216. For example, the storage device 200 can be re-stroked to one hundred (100) Gigabytes. Upon re-stroking the storage device 200, the application loader 204 can return control to the MBR 202 to boot or load the hidden partition 216. Upon exit or initialization, the application loader 204 can de-stroke the storage device 200 to return the storage device 200 to a visible size of ninety (90) Gigabytes. In this manner, the hidden partition 216 can be accessed through re-stroking and de-stroking the storage device 200 to access and hide the hidden partition 216 as desired.

Figure 3:
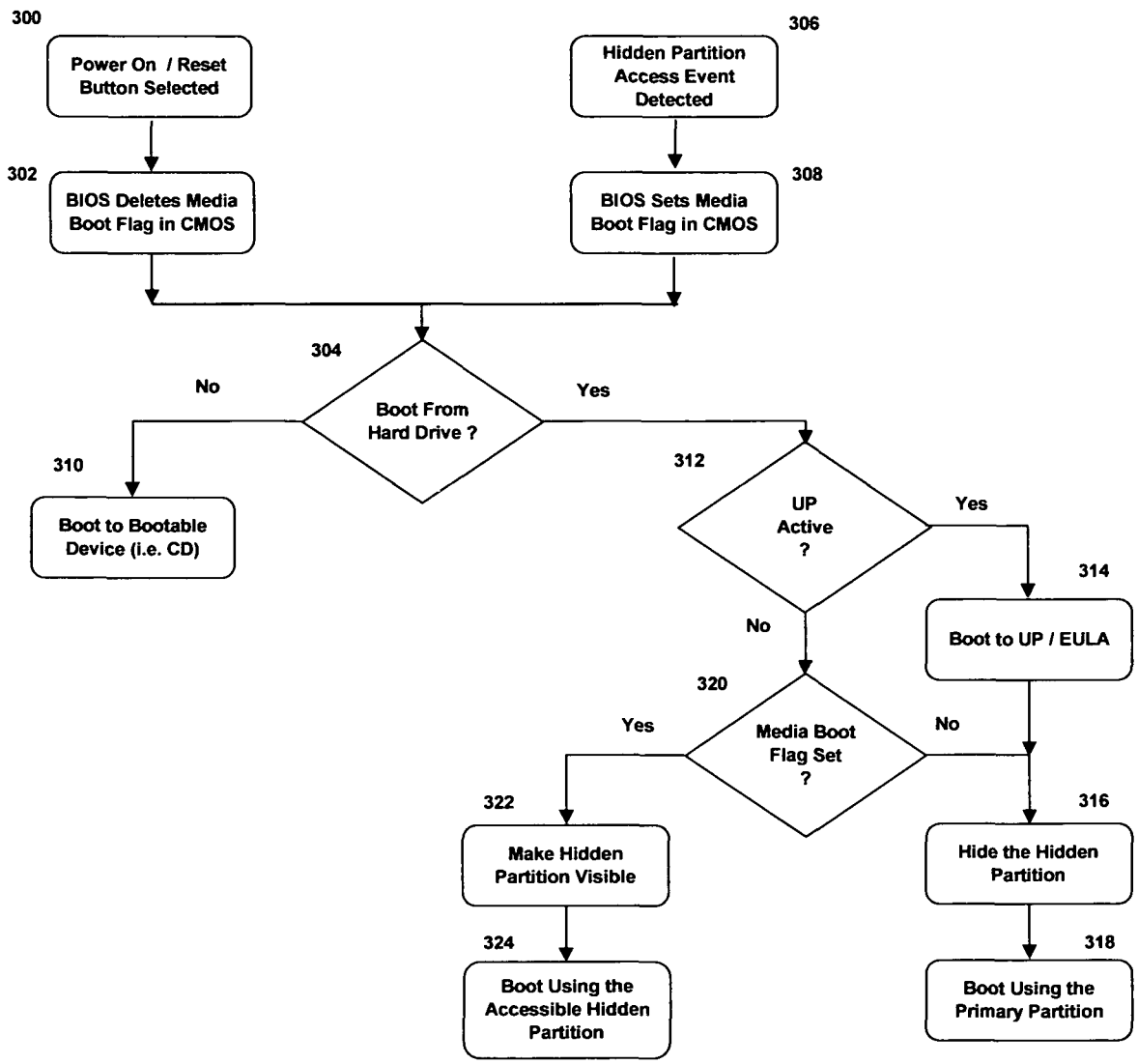
FIG. 3 illustrates a flow diagram of method for accessing a hidden partition of a storage device during a boot sequence according to one aspect of the disclosure.

FIG. 3 illustrates a flow diagram of method for accessing a hidden partition within a storage device of an information handling system according to a further aspect of the disclosure. The method can be used by the information handling system 100 illustrated in FIG. 1 or other information handling systems operable to employ the method of FIG. 3. Additionally, the method of FIG. 3 can be stored as encoded logic or software and can be stored or provided within a memory, an optical storage device, a magnetic storage device, or any other type of storage medium that can be provided in association with at least a portion of the method of FIG. 3.

The method begins generally at 300 when a "power on" button or "reset" button of an information handling system may be selected. For example, a user can select a "power on" button and a boot sequence can be initiated in response to the "power on" button selection. Similarly, a user can select a "reset" button to reinitialize the information handling system. For example, a "reset" button can be provided as a physical button however in some embodiments a reset button can be provided as a graphical element or icon that can be selected via a graphical user interface displayed within a display unit of the information handling system.

Upon detecting a "power on" button or "reset" button selection, the method proceeds to step 302 and the BIOS of the information handling system deletes a media boot flag. For example, a media boot flag can be stored within a memory of the information handling system and accessed during initialization or a boot sequence. The media boot flag can be set or deleted to indicate selection of a media boot input. In one form, a "simple boot flag" can be set by the BIOS in a register in CMOS memory of the information handling system in response to accessing a media application, and can be reset or cleared as desired. At step 302, the BIOS can delete the media boot flag in response to detection of the "power on" or "reset" button selection and proceeds to decision step 304. At decision step 304, the method determines if the information handling system should boot from a primary storage device, such as a primary hard disk drive, or a secondary device. For example, if a secondary device should be used during a boot sequence, the method can proceed to step 310 and another bootable device, such as an optical disk drive, a tape drive, a holographic optical storage device, an external storage device, etc. can be used to boot the information handling system.

According to one aspect, the method can also begin at step 306 when a specific event may be detected by the information handling system to access a hidden partition. For example, the method can detect selection of an input button, such as a media application access button, provided in association with the information handling system. In one form, a MediaDirect or other media access button can be provided and a selection of the MediaDirect button can be detected at step 306. For example, the MediaDirect button or media access button can be provided as a separate hardware button and in other forms, can be provided in association with a function button, such as a home button, an icon, etc. of the information handling system.

Upon detecting a hidden partition access event request, the method proceeds to step 308 and the BIOS sets a "media boot flag" within the memory of the information handling system. In one embodiment, setting the "media boot flag" can indicate that another partition other than the primary partition can be used during boot sequence. Upon setting the "media boot flag," the method proceeds to step 304 and determines if a secondary device should be used to boot from. If a secondary device should be used, the method proceeds to step 310 and the information handling system can be booted using secondary device.

If at decision step 304, a primary hard disk drive should be used to boot from, the method proceeds to step to decision step 312 and determines if the status of a utility partition (UP) within the primary hard disk drive. For example, the UP may be active during an initial system installation or system restore. If the UP is active, the method proceeds to step 314 and the information handling system accesses the contents of the utility partition and displays an End User License Agreement (EULA) to the user. Upon a user agreeing to the EULA, the method may proceed to step 316 and ensures that the hidden partition remains hidden and may not be accessed. For example, the method can ensure that the hidden partition can be disassociated with visible partition descriptors for visible partitions of the primary hard disk drive. In one form, the hard disk drive can include a master partition table that can be modified to replace or remove a descriptor referencing the hidden partition. In another embodiment, the hidden partition can be physically hidden from an operating environment by de-stroking the hard disk drive to provide the hard disk drive as having a storage space that appears to be less than when the hidden partition is visible. The method may then proceed to step 318 and the information handling system can boot using an operating system stored within the primary partition. For example, the information handling system can boot using a primary operating system such as Microsoft® Windows XP®, Linux, etc. operating system.

If at decision step 312 the utility partition is not active, the method can proceed to decision step 320 and determine if the media boot flag has been set within a register in CMOS memory of an information handling system. For example, if a register within CMOS memory of an information handling system can include one or more flags including a media boot flag that may be set. If the media boot flag has been set, the method proceeds to step 322 and the hidden partition can be made visible for access by the information handling system. For example, the hidden partition can be accessed by associating a known valid descriptor of another known visible partition, such as the system restore partition. In one embodiment, an application loader can be provided in association with a MBR of the primary hard disk drive and can update a reference in the MBR to point to the hidden partition using a visible partition descriptor.

Upon making available the hidden partition at step 322, the method can then proceed to step 324 and access to at least a portion of the contents stored within the hidden partition may be provided to boot the information handling system. For example, in one form, the hidden partition can include a MediaDirect host protected area (HPA) and the MediaDirect HPA descriptor can be exchanged with the system restore descriptor within the MBR. In the manner, the hidden partition including the MediaDirect HPA software can be made available and loaded into a memory of the information handling system to boot from. As such, an information handling system can include a hard disk drive with a limited number of visible partitions and access to one or more hidden partitions can occur during a boot sequence.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a basic input output system (BIOS) operable to access a master boot record (MBR) of a hard disk drive (HDD) including four visible partitions operable to be accessed during a boot sequence in association with detecting a boot event;
 a processor operable to detect the boot event, wherein the boot event is operably associated with initiating a request to access contents stored within an associated hidden partition of the HDD;
 a memory operable to store at least a portion of the contents of the hidden partition upon accessing the hidden partition using an association established between at least one of the four visible partitions and the hidden partition; and
 an application loader operable to enable access to the hidden partition as the at least one of the four visible partitions.

2. The system of claim 1, wherein the boot event is operably associated with selling a media boot flag to access a media application stored within the hidden partition.

3. The system of claim 1, further comprising an input device operable to provide a user input request to access a media application stored within the hidden partition.

4. The system of claim 3, wherein the input device includes a keyboard operably coupled to the processor, the keyboard including an application request button operably associated with the media application.

5. The system of claim 4, further comprising the hidden partition operable to be accessed by the application loader in response to a user activating the application request button.

6. The system of claim 1, further comprising:
 the MBR operable to provide access to the four visible partitions during a boot sequence; and
 the application loader operably associated with the MBR to provide access to the hidden partition during the boot sequence.

7. The system of claim 1, wherein the application loader is operable to associate a first descriptor of the hidden partition with a second descriptor of at least one of the four visible partitions.

8. The system of claim 7, wherein the hidden partition includes a hidden media application partition and one of the four visible partitions includes a system restore partition.

9. A method for booting an information handling system using a hidden partition of a storage device, the method comprising the steps of:
 receiving a boot request;
 accessing a master boot record (MBR) of a hard disk drive (HDD) to determine a current operating state of the HDD;
 activating an application loader associated with the HDD to modify an initialization sequence in response to a media boot flag being set;
 determining an operating status of a visible partition;
 exposing a hidden partition within the HDD in response to the operating status of the visible partition being inactive;
 enabling access to the hidden partition using a first descriptor of the visible partition;
 associating the first descriptor of the visible partition with a second descriptor of the hidden partition;
 directing the boot sequence to access the second descriptor of the hidden partition using the first descriptor of the visible partition;
 detecting a second boot request;
 disassociating the first descriptor of the visible partition from the second descriptor of the hidden partition;
 directing access to a visible operating system partition of the HDD; and
 initializing the information handling system using the visible operating system partition.

10. An information handling system comprising:
 a basic input output system (BIOS) operable to access a master boot record (MBR) of a hard disk drive (HDD) including four visible partitions operable to be accessed during a boot sequence in association with detecting a boot event;
 a processor operable to detect the boot event, wherein the boot event is operably associated with initiating a request to access contents stored within an associated hidden partition of the HDD;
 a memory operable to store at least a portion of the contents of the hidden partition upon accessing the hidden partition using an association established between at least one of the four visible partitions and the hidden partition; and
 an application loader operable to enable access to the hidden partition as the at least one of the four visible partitions, wherein the application loader is operable to associate a first descriptor of the hidden partition with a second descriptor of the at least one of the four visible partitions.

11. The system of claim 10, wherein the hidden partition includes a hidden media application partition and one of the four visible partitions includes a system restore partition.

* * * * *